Patented Nov. 27, 1928.

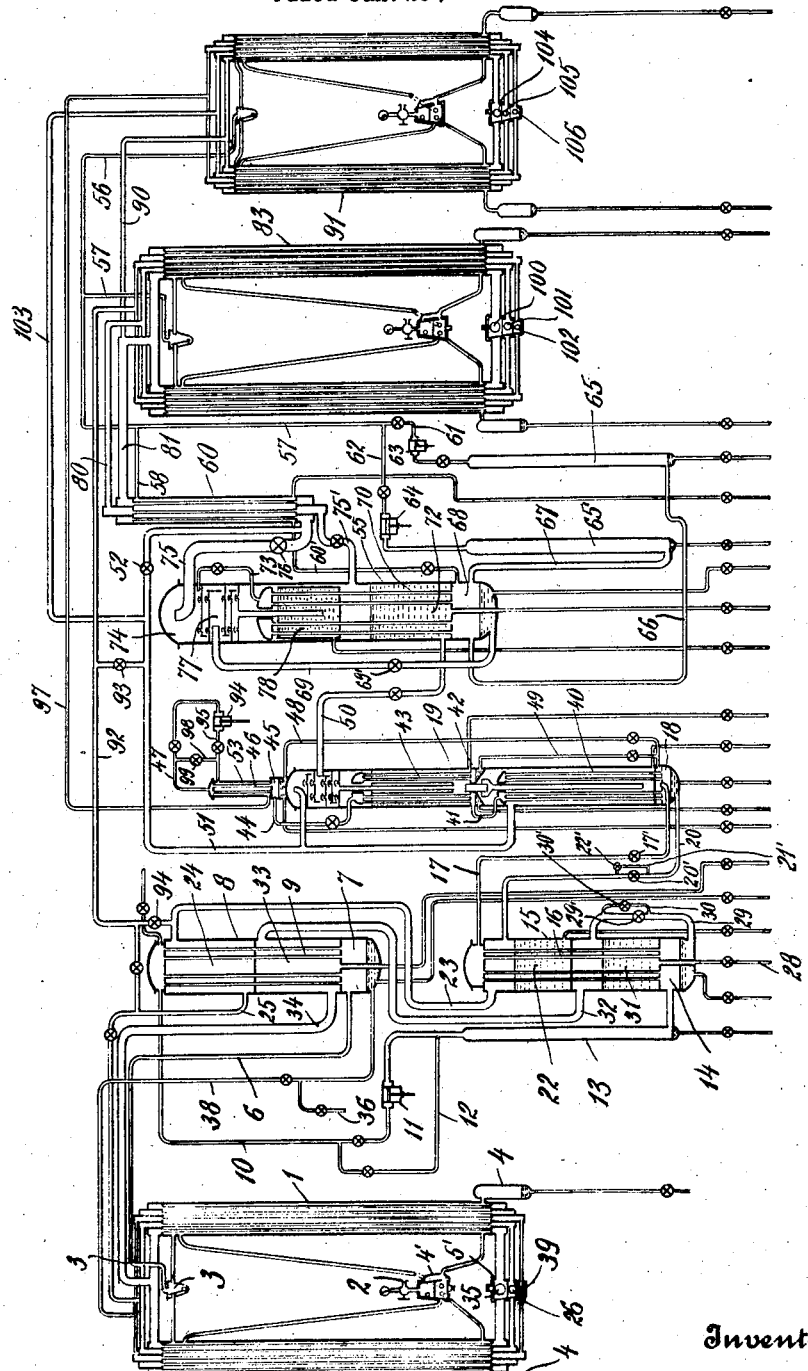

1,693,052

UNITED STATES PATENT OFFICE.

MONTAGUE H. ROBERTS, OF JERSEY CITY, NEW JERSEY, ASSIGNOR TO AIR REDUCTION COMPANY, INC., A CORPORATION OF NEW YORK.

SEPARATION OF GASES FROM GASEOUS MIXTURES.

Application filed January 25, 1919. Serial No. 273,186.

This invention relates to the separation of gases from gaseous mixtures, and more particularly to the separation and recovery of difficultly liquefiable gases, such as hydrogen or helium, from gaseous mixtures containing them.

Natural gas from certain fields contains helium in small but appreciable amount admixed with other gases, such as nitrogen, methane, and other hydrocarbons. The amount of helium is usually a fraction of a percent of the total gaseous mixture. A Texas natural gas, for example, has been found to have the following approximate analysis, the percentages being by volume:

| | Per cent |
|---|---|
| Nitrogen | 31 |
| Methane ($CH_4$) | 54 |
| Helium and other rare gases | 0.94 |
| Remainder, consisting of ethane, propane, and other higher hydrocarbons, about | 14 |

The method and apparatus of the present invention will be more particularly described in connection with the separation and recovery of relatively pure helium gas from such a gaseous mixture, but it will be understood that the invention, in certain of its aspects, is of more general application to the treatment of other gaseous mixtures than natural gas, and to the recovery therefrom of other gases, and other difficultly liquefiable gases, than helium, e. g. of hydrogen from water gas, or other gaseous mixtures containing it, etc.

The method and apparatus of the present invention have certain features of similarity with the known methods and apparatus for the liquefaction of atmospheric air or other gaseous mixtures and the separation and recovery therefrom of the various constituents; but they are distinguished from such known methods and apparatus in certain important respects, as will be hereinafter more fully pointed out.

The method and apparatus of the present invention provide for the recovery, in a relatively pure or concentrated state, of gases, such as helium, which are present in very small amount in the gaseous mixture; and for the attainment of the necessary low temperatures therefor. Thus, for example, in order to obtain an output of about 700 cu. ft. of helium gas of high purity per hour, it is necessary for about 75,000 cu. ft. per hour of natural gas to be passed through the apparatus; and it is likewise necessary for the apparatus to be operated at a very low temperature.

In the method of the invention for the recovery of helium from natural gas, the natural gas is taken from a supply holder, or from any suitable source of supply, and is subjected to a preliminary treatment. such as passage through a series of caustic soda scrubbing towers, in order to remove carbon dioxide. It is then passed through a vapor trap, and thence to the compressors where it is compressed to the required pressure at a temperature of, e. g., about 20° C.

The compressed gas, after passing through oil and moisture separators, and a calcium chloride drier, goes to a set of exchangers similar in construction to those commonly employed in liquid air apparatus, for example, in the Claude apparatus for the liquefaction of air and the production therefrom of gases rich in oxygen and rich in nitrogen respectively. In these exchangers, the compressed gas is brought into indirect contact with cold gases escaping from the apparatus, and its temperature is reduced to, e. g., about minus 90° C. in this way.

The gas is now in a cold compressed state and contains substantially all of its various constituents except such as have been removed in the preliminary treatment and such as have been liquefied and separated in the preliminary exchangers. If the natural gas has been previously treated for the production of casing head gasolene therefrom, it will contain a materially less amount of readily liquefiable constituents than where it has not been so treated.

In the accompanying drawing, there is shown, somewhat conventionally and in diagram, apparatus illustrative of the present invention, and adapted to the practice of the method of the present invention; and the invention will be further described in connection therewith.

Referring to the apparatus illustrated, the preliminary exchangers for the compressed gaseous mixture are indicated at 1, the inlet for the compressed gas being indicated at 2, and the outlet from the exchangers at 3. Traps or receptacles 4 are provided for the reception of whatever constituents may be liquefied in the preliminary exchangers.

From the exchangers 1 the cold compressed gaseous mixture passes through the pipe 6 to the bottom compartment 7 of the liquefier 8. The gaseous mixture passes up through the tubes 9, which are surrounded by cold gases. As a result partial liquefaction takes place and the more liquefiable hydrocarbons are separated out in the tubes 9 and collect in the compartment 7. This liquid is drawn off through the pipe 36, or it may be passed through the pipe 38 back to the preliminary exchangers to assist in the preliminary cooling of the entering compressed gas. The outlet for the vaporized liquid is indicated at 39.

The unliquefied portions of the gaseous mixture, consisting almost entirely of nitrogen and methane, together with the small amount of rare gases, pass from the liquefier 8 through the pipe 10 to the expansion engine 11, where they are expanded and cooled, for example, to a pressure of about 4 atmospheres. Owing to the separation of higher hydrocarbons, etc., the volume of the gas (at atmospheric pressure) will have been reduced from about 75,000 cu. ft. to about 64,000 cu. ft., the remainder having been removed in a liquefied state in the liquefier 8 in the manner above described. A by-pass pipe 12 around the expansion engine 11 permits by-passing of part of the gaseous mixture if desired.

The cold expanded mixture from the expansion engine 11 passes through the pipe 13 at a pressure of about 4 atmospheres to the bottom compartment 14 of the special liquefier 15. The pipe 13 is preferably enlarged in cross-section to provide an equalizing chamber. The unliquefied gas passes upwardly through the tubes 16, which are exposed to the cooling action of the surrounding liquid, and in which liquefaction of the methane of the gaseous mixture takes place. The liquid methane collects in the bottom compartment 14, while the residual unliquefied gas, made up mostly of nitrogen (about 23,250 cu. ft. per hour) and rare gases (about 700 cu. ft. per hour), escapes through the outlet pipe 17 and expansion valve 17′ to the bottom compartment 18 of the column 19 at a temperature of around minus 165° C.

The liquid from the compartment 18 of the column 19, which liquid is made up almost entirely of nitrogen at a low temperature of, e. g., around minus 176° C., passes through the pipe 20 and expansion valve 20′ to the upper liquid compartment 22 of the special liquefier 15. A by-pass 21′ with a valve 22′ permits passage of the liquid about the valve 20′. This liquid nitrogen serves to cool the gases passing upwardly through the tubes 16, and is itself vaporized, the vapors therefrom escaping through the pipe 23 to the upper compartment 24 of the special hydrocarbon liquefier 8, and thence through the pipe 25 to the preliminary exchangers 1. The outlet from the preliminary exchangers of this nitrogen gas is indicated at 26.

The liquid, essentially methane, which collects in the bottom compartment 14 of the methane liquefier 15 is forced through the pipe 29 and by-pass 30 having expansion valves 29′ and 30′ to the lower liquid receptacle 31 of the methane liquefier 15. This liquid methane assists in the cooling of the gaseous mixture flowing upwardly through the tubes 16 and in the liquefaction of methane therein, while the liquid methane in the compartment 31 is itself vaporized at a lower pressure and escapes through the pipe 32 to the lower compartment 33 of the special hydrocarbon liquefier 8 and thence through the pipe 34 to the preliminary exchangers 1, from which it escapes at 35.

The construction of the special or preliminary liquefiers 8 and 15 is accordingly such that a preliminary liquefaction of the higher hydrocarbons is effected in the liquefier 8 by means of the vaporized methane and nitrogen passing through the compartments 33 and 24, respectively, of the liquefier; while the methane of the gaseous mixture is liquefied in the liquefier 15 by means of the liquid methane and liquid nitrogen contained in the compartments 31 and 22, respectively, which liquids are in turn vaporized and pass in vapor state to the corresponding compartments of the liquefier 8.

It will be noted further that the temperature in the upper compartment 22 of the methane liquefier, which contains liquid nitrogen, is lower than that of the lower compartment 31 of the methane liquefier, which contains liquid methane, so that the gaseous mixture passing upwardly through the tubes is subjected to a colder temperature in the upper portion of the tubes 16 than in the lower portion. Similarly, the gaseous mixture passing upwardly through the tubes 9 of the liquefier 8 is subjected in the lower portion of the tubes to indirect contact with the vaporized methane, and in the upper portion of the tubes to indirect contact with the vaporized nitrogen which is at a lower temperature, so that a similar progressive cooling takes place during the passage of the gaseous mixture upwardly through the tubes 9.

The gaseous mixture which enters the bottom compartment 18 of the column 19, and which consists for the most part of nitrogen, together with the rare gases, passes upwardly through the tubes 40, which are surrounded with liquid nitrogen, and in which a partial liquefaction of the nitrogen of the gaseous mixture takes place. This liquefied nitrogen flows back into the compartment 18, while the remaining unliquefied gas passes upwardly through the connection pipe 41 to the lower compartment 42 of another condenser and thence up through the tubes 43, which are surrounded by liquid nitrogen, and in which further liquefaction takes place. The residual gas from which most of the nitrogen has been separated in liquid state, and which now contains a large proportion of helium, passes through the connecting pipe 44 to the lower compartment 45 of the liquefier 53, and thence upwardly through the tubes 46 thereof, in which a further liquefaction of nitrogen takes place. The remaining gas which is now rich in helium escapes through the pipe 47 to an engine 94, where it expands with external work and is thereby cooled. The gas is returned through a pipe 95 to the liquefier 53, and after circulating about the tubes 46 escapes through a pipe 97 to the exchanger 91, and finally issues through an outlet 106, passing to a suitable storage receptacle. A by-pass 98 provided with a valve 99 connects the pipes 47 and 95 and permits regulation of the engine 94 or cooling of the gas by simple expansion without external work.

Any nitrogen liquefied in the tubes 46 and collecting in the compartment 45 flows back through the pipe 48 to the bottom compartment 18 of the column. The nitrogen separated in liquid state in the tubes 43 similarly collects in the compartment 42 and flows back through the pipe 49 to the compartment 18.

The cold for effecting the liquefaction of the nitrogen from the gaseous mixture in the series of tubes 40 and 43, is supplied by liquid nitrogen introduced from a special nitrogen column 55 through the pipe 50 into the compartment surrounding the tubes 43. This liquid nitrogen is in part vaporized by the gaseous mixture flowing upwardly through the tubes 43, and in part over-flows into the liquid nitrogen receptacle surrounding the lower series of tubes 40, where further vaporization takes place due to the heating action of the gaseous mixture flowing upwardly through the tubes 40. The action which goes on within the column 19 accordingly involves the vaporization of liquid nitrogen at a low temperature, e. g., of around minus 194° C., and the simultaneous liquefaction of the nitrogen from the gaseous mixture flowing upwardly through the series of tubes 40 and 43 at a pressure of, for example, 4 atmospheres. The vaporized nitrogen from the column 19 escapes through the pipe 51, having therein a regulating valve 52.

The construction of the column 19 is such that the nitrogen of the gaseous mixture passing up through the tubes is progressively liquefied and removed. As the gaseous mixture flows upwardly through the tubes its content of helium progressively increases, while its content of nitrogen progressively decreases, so that a progressive purification takes place in accordance with the principle of backward return. Moreover this progressive purification, with progressive removal of the impurities, and progressive enrichment of remaining unliquefied gas in helium takes place in such a manner that the liquefied nitrogen flows downwardly into contact with gases poorer in helium, so that any helium dissolved or absorbed by the liquefied nitrogen tends to be revaporized or distilled therefrom. As a result the down-flowing nitrogen is impoverished in absorbed or dissolved helium during its backward flow, while at the same time the upwardly flowing gases become richer and richer in helium. As the helium content increases the gases come into contact with progressively smaller and smaller amounts of liquid nitrogen, so that there is less opportunity for absorption or solution of the helium in the liquefied nitrogen as its purity increases, and so that such amounts as are absorbed or dissolved are afforded an opportunity for revaporization during the backward flow of the liquefied nitrogen into contact with gases poorer in helium.

As the result of this progressive enrichment of the gases, and progressive separation of impurities therefrom in a liquid state, there is but little loss of the helium in the liquefied hydrocarbons and nitrogen separated therefrom. The remaining gaseous mixture which escapes through the pipe 44 into the upper liquifier 53 may thus be enriched to a content of around 80% of helium, and may be cooled to a temperature of around minus 192° C.

The special nitrogen column 55, which supplies cold in the form of liquid nitrogen to the column 19 through the pipe 50, is particularly designed so that after it is in operation only nitrogen gas will be supplied thereto; thus only nitrogen, either in liquid or gaseous state is contained in the column during its normal operation. The apparatus is, however, adapted for operation for the treatment of atmospheric air and the production of nitrogen gas of high purity therefrom.

In the normal operation of the column the cold compressed nitrogen from the preliminary exchangers enters through the pipes 56 and 57, and passes in part through the branch pipe 58 to the liquefier 60, and in part through the branch pipes 61 and 62 to expansion engines 63 and 64, where the compressed gas is expanded with external work, and its temperature and pressure materially reduced. Expansion engine 64 is shown as of a larger size than expansion engine 63. Equalizing chambers 65 and 65' are provided to receive the exhaust from these engines. The cold expanded gases from the respective expansion engines pass through the pipes 66 and 67 to the bottom compartment 68 of the nitrogen column 55. The nitrogen liquefied in the liquefier 60 flows through the pipe 60', and also enters the lower compartment 68 of the nitrogen column.

The liquid collected in the compartment 68 is forced upwardly through the pipe 69, past the regulating and pressure-reducing valve 69', therein, and is discharged into the upper portion of the column at a lower pressure. This liquid flows down over the baffles 77 and collects in the receptacle 78.

The unliquefied nitrogen from the compartment 68 flows upwardly through the tubes 70, which are surrounded by liquid nitrogen at a lower pressure in the receptacles 78 and 72. As a result a partial liquefaction of nitrogen takes place in the tubes 70, and this nitrogen collects in the compartment 68. The unliquefied nitrogen then passes up through pipe 73 to the compartment 74, from which it escapes through a pipe 75, past the pressure-reducing valve 76, to the liquefier 60. The pipe 51, previously described, joins the pipe 75 adjacent the liquefier. Nitrogen vaporized in the column 55 escapes through the pipe 75 and through a pipe 75' to the liquefier 60, and thence passes through pipes 80 and 81 to the exchanger 83. A portion of the nitrogen from the pipe 81 passes through a pipe 90 to an exchanger 91. A pipe 92 controlled by valves 93 and 94 may deliver nitrogen from the pipes 23 and 51 to the exchanger 83. A pipe 103 delivers nitrogen from the pipe 51 to the exchanger 91. During its passage through the liquefier 60 and exchanger 83, the gaseous nitrogen serves to cool the incoming gas flowing to the column 55. The nitrogen issues from the exchanger 83 and 91, through outlets 100, 101 and 102, and is delivered to a suitable gasometer (not shown). Similarly nitrogen is delivered from the exchanger 91 through outlets 104 and 105 to the gasometer. The nitrogen column operates in the well known manner to produce liquid nitrogen and gaseous nitrogen vaporized therefrom. The amount of liquefied nitrogen is increased by the provision of the two expansion engines, which increase the cold supplied to the column with resulting increase in the amount of nitrogen liquefied therein.

The nitrogen column 55 above described is intended to operate upon pure nitrogen, and it is contemplated that a sufficient supply of nitrogen shall be available for this purpose. To this end, a small nitrogen column may be operated for the production of nitrogen from the air in amount sufficient to make up for the loss of nitrogen in the process. The nitrogen escaping from the apparatus can, of course, be collected in a suitable storage reservoir and used over and over again in the apparatus. Similarly the nitrogen separated from the natural gas, if it is of sufficient purity, can be employed to supply part or all of the surplus nitrogen lost during the process, in which case a separate supply of nitrogen may be unnecessary.

In order to produce a sufficient amount of pure nitrogen gas in the first instance, the column 55 may operate upon atmospheric air and separate it into pure nitrogen gas and into a gas rich in oxygen. The operation of the apparatus upon atmospheric air is similar to that above described, but the column will, of course, contain both oxygen and nitrogen. The liquid flowing down through the column will become richer and richer in oxygen, and the liquid collecting in the bottom of the column will be rich in oxygen. The gas escaping through the pipe 75' will accordingly be rich in oxygen. The gases passing upwardly through the column will become richer and richer in nitrogen and substantially pure nitrogen gas can be drawn off from the top of the column through the pipe 75. The liquefaction of the atmospheric air will in part take place in the liquefier 60, and in part in the tubes 70, in a manner which will be readily understood. After a sufficient supply of nitrogen has thus been produced, the apparatus may be operated upon nitrogen alone in the manner above described.

Where the column 55 is not required to operate upon atmospheric air for the production of nitrogen in the first instance, it is not necessary that it should be provided with any considerable number of trays 77, inasmuch as its function is primarily that of producing liquid nitrogen, and of vaporizing part of the liquid nitrogen thus produced without any separation of oxygen therefrom.

The provision of two expansion engines, as above pointed out, enables an increased amount of cold to be produced in the column with resulting increase in the amount of liquid nitrogen produced, so that a sufficient amount of the liquid nitrogen can be drawn off for use in the column 19 without interfering with the continued operation of the nitrogen column itself.

With the construction illustrated it will be seen that the cold for the purification of the gaseous mixture in the column 19, and for the liquefaction of nitrogen therefrom, is supplied by the liquid nitrogen from the column 55, and that this liquid nitrogen and the nitrogen gas vaporized therefrom do not come into direct contact with the gaseous mixture undergoing separation and purification. That is, the cycle of the nitrogen which supplies the cold, and the circulation of the gaseous mixture undergoing separation, are kept separate from each other, while the necessary cold for the separation is nevertheless supplied by the liquid nitrogen.

It will further be seen that the liquid nitrogen produced from the gaseous mixture undergoing treatment is made use of in the preliminary separation of hydrocarbons from the gaseous mixture; while the liquefied methane separated from the gaseous mixture is similarly made use of in the preliminary liquefaction of hydrocarbons from the gaseous mixture. Moreover the various constituents of the gaseous mixture, namely, the higher hydrocarbons separated in the liquefier 8, the methane separated in the liquefier 15, and nitrogen liquefied in the column 19, are kept separate from each other and are separately made use of after the preliminary cooling and liquefaction of the gaseous mixture. These respective gases can accordingly be drawn off through the respective outlets 39, 35 and 26 of the preliminary exchanger. The residual cold in the nitrogen and methane gases from the liquefier 8, as well as the cold from the hydrocarbons liquefied in the liquefier 8, is made use of in the preliminary exchangers 1, which are reversible by means of valves 3', 4' and 5', so that the respective cold gases can be passed through either of the preliminary exchangers.

Considering the method as a whole, accordingly, it will be noted that the compressed gaseous mixture is preliminarily cooled by the cold from the escaping gases; that the cold compressed gaseous mixture is then subjected to progressive liquefaction for the separation, first, of the heavier hydrocarbons, and, next, of the methane, and that this progressive liquefaction is effected by the cold supplied by the liquefied methane at a lower pressure and the vapor formed therefrom, and by the liquid nitrogen and the nitrogen vapors therefrom. It will further be seen that the gaseous mixture, after the preliminary separation of hydrocarbons therefrom, is subjected to a further liquefaction for the progressive separation of nitrogen in the manner above described, so that the remaining unliquefied gas becomes progressively richer and richer in helium without any considerable loss of the helium in the liquefied nitrogen which is progressively separated therefrom. This progressive liquefaction of the various constituents is moreover effected in such a way that the greater portion of the other gases is removed from the gaseous mixture while the helium is still in a dilute state, so that there is little loss of the helium by solution or absorption in these liquefied constituents. As the helium gas increases in purity it comes in contact with progressively less and less of the liquefied impurities, so that its loss by solution or absorption is still kept low.

The method of the present invention is accordingly distinguished from methods in which substantially complete liquefaction of the gases is effected in the presence of the helium or similar rare gases, and in which a considerable amount of the helium is lost by absorption in the large amount of liquefied gases with which it is maintained in contact.

While the various parts of the method and apparatus illustrated and above described are advantageously combined in the complete apparatus and method, nevertheless I consider that certain of the parts of the method and apparatus are capable of more general application, and in combination with other specific methods and apparatus. The column for supplying liquid nitrogen may thus vary in its construction provided it supplies the added cold to the process. So also the further purification of the helium gas after it has been brought to a relatively high state of concentration is applicable to mixtures of helium gas with other gases produced otherwise than in the particular manner illustrated and described. The purification of the helium gas by expansion, and by employment of the colder expanded gas for the further cooling, is likewise a procedure of more or less general application.

The construction of the preliminary liquefiers for the separation of the hydrocarbons can also be varied, and the separation of these hydrocarbons effected otherwise than in the specific manner described and illustrated, but I nevertheless consider the particular manner illustrated and described as an advantageous manner for effecting this preliminary separation, and one well adapted for use in the complete method.

While the method and apparatus are thus of more or less general application to the treatment of various gaseous mixtures, and while various parts of the apparatus can be varied and are capable of more or less general application, nevertheless I consider the method and apparatus illustrated and described an improved and advantageous means and method for the production of helium gas of high purity from gaseous mixtures containing it in small amount, such as natural gas of the character above described.

What I claim is:

In a process of obtaining helium from natural gas, compressing and cooling the gas, expanding the cooled compressed gas and thereby liquefying a portion thereof, subjecting the remaining expanded gas to successively lower temperatures to condense its constituents other than helium in the order of their liquefying temperatures at the pressure to which they were expanded, collecting the liquids separately, and utilizing said liquids separately in cooling the gas to the said successively lower temperatures; whereby helium in gaseous form is concentrated as a final residue; and conducting off and collecting such final residue.

In testimony whereof I affix my signature.

MONTAGUE H. ROBERTS.